United States Patent
Ahn et al.

(10) Patent No.: US 7,626,590 B2
(45) Date of Patent: Dec. 1, 2009

(54) METHOD AND APPARATUS FOR GENERATING PROCEDURAL TEXTURE FOR NATURAL PHENOMENA AND RECORDING MEDIUM STORING THE METHOD

(75) Inventors: Jeonghwan Ahn, Suwon-si (KR); Dokyoon Kim, Seongnam-si (KR); Keechang Lee, Yongin-si (KR); Sangoak Woo, Anyang-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 231 days.

(21) Appl. No.: 11/340,499

(22) Filed: Jan. 27, 2006

(65) Prior Publication Data

US 2006/0170696 A1 Aug. 3, 2006

(30) Foreign Application Priority Data

Jan. 28, 2005 (KR) ...................... 10-2005-0008000

(51) Int. Cl.
*G09G 5/00* (2006.01)
(52) U.S. Cl. ...................... 345/582; 345/583; 345/584; 345/585
(58) Field of Classification Search .......... 345/582–586
See application file for complete search history.

(56) References Cited

U.S. PATENT DOCUMENTS 6,788,304 B1\* 9/2004 Hart et al. ................... 345/586
2002/0057277 A1\* 5/2002 Wood et al. ................. 345/582

OTHER PUBLICATIONS

Baekkelund, Christian et al., A Computer Graphics Simulation of Fire Using Particle Systems and Hypertextures, p. 5, 7-8.*
Holtkamper, Thorsten, Real-time Gaseous Phenomena—A Phenomenological Approach to Interactive Smoke and Steam, p. 26-29.*

\* cited by examiner

*Primary Examiner*—Hau H Nguyen
(74) *Attorney, Agent, or Firm*—Staas & Halsey LLP

(57) ABSTRACT

A method of generating procedural textures for a plurality of natural phenomena, and an apparatus to perform the method, the method including inputting a set of common parameters required to represent the plurality of natural phenomena; inputting a set of specific parameters required to represent physical properties of at least one of the natural phenomena; generating a noise value using the common parameters and the specific parameters; determining which procedural texture is to be generated according to the common parameters; and generating the procedural texture according to the determination results using the noise value, the common parameters, and the specific parameters.

22 Claims, 12 Drawing Sheets

Side = 64

Side = 32 stepU = 2.0 stepU = 10.0 scale=1.5 scale=2.5 offset = (0,0)

offset = (0.7,0)

numOctaves = 0 numOctaves = 1 numOctaves = 5 radius = 0.5　　　　　radius = 5 expon = 7.5　　　　　expon = 1 heightRampingOff = 0.6　　　heightRampingOff = 1.0 heightAddTurbulence = 0    heightAddTurbulence = 1 radius = 0.05    radius = 0.5

Swirling = 0.3    Swirling = 0.9

Disperse = 10

Disperse = 1 noiseFactor = 5 noiseFactor = 0

Exp = 0.9    Exp = 0.0

METHOD AND APPARATUS FOR GENERATING PROCEDURAL TEXTURE FOR NATURAL PHENOMENA AND RECORDING MEDIUM STORING THE METHOD

CROSS-REFERENCE TO RELATED APPLICATIONS

This application claims the benefit of Korean Patent Application No. 10-2005-0008000, filed on Jan. 28, 2005, in the Korean Intellectual Property Office, the disclosure of which is incorporated herein by reference.

BACKGROUND OF THE INVENTION

1. Field of the Invention

The present invention relates to a texture generation technique, and, more particularly, to a method of generating a 3-dimension-based procedural texture for natural phenomena, an apparatus to perform the method, and a recording medium storing the method.

2. Description of the Related Art

Objects in the natural world constantly vary, even though they are different in nature and in terms of the extent to which they vary. In the 3D-based graphics field, a procedural texture generation technique using a random number generator is typically used to generate a texture that can represent an object in the natural world, and its variation, as naturally as possible. However, sometimes output of a random number generator can be too harsh to appear natural.

In order to solve this problem, a procedural texture generation technique using a Perlin noise function that can more naturally render an object by adding noise functions at a range of different scales has been suggested. The Perlin noise function generates a random number by calculating one or more parameters based on a seed value. In other words, the Perlin noise function generates Perlin noise by adding values determined by a noise function and interpolation function and a smoothed noise value at the range of different scales.

However, the procedural texture generation method using the Perlin noise function does not consider physical properties of natural phenomena, and generates a texture for the natural phenomena based on the noise-based density characteristics of the Perlin noise function. Accordingly, the procedural texture generation method using the Perlin noise function cannot generate a texture for a natural phenomenon such as a briskly burning fire, or smoke swirling and then dissolving into the air.

In the procedural texture generation method using the Perlin noise function, a texture for natural phenomena is generated using an individual algorithm based on an individual set of parameters for the natural phenomena. For example, in order to generate textures for steam, flames, and smoke, the procedural texture generation method using the Perlin noise function must include sets of parameters for steam, flames, and smoke, and algorithms based on the sets of parameters for steam, flames, and smoke.

Accordingly, if a user wants to generate a procedural texture for a new natural phenomenon, or to modify an existing set of parameters for a certain natural phenomenon, the user must redundantly make a set of parameters and algorithm for a corresponding natural phenomenon.

SUMMARY OF THE INVENTION

The present invention provides a method of generating a procedural texture for natural phenomena in which texture generation designs for various natural phenomena are unified so that the texture generation designs are easy to author and program, an apparatus to perform the method, and a recording medium storing the method.

The present invention also provides a method of generating a procedural texture for a natural phenomenon based on noise and the physical characteristics of the natural phenomenon, an apparatus to perform the method, and a recording medium storing the method.

Additional aspects and/or advantages of the invention will be set forth in part in the description which follows and, in part, will be apparent from the description, or may be learned by practice of the invention.

According to an aspect of the present invention, there is provided a method of generating procedural textures for a plurality of natural phenomena. The method includes: inputting a set of common parameters required to represent the plurality of natural phenomena; inputting a set of specific parameters required to represent the physical properties of at least one of the natural phenomena; generating a noise value using the common parameters and the specific parameters; determining which procedural texture is to be generated according to the common parameters; and generating the procedural texture according to the determination results using the noise value, the common parameters, and the specific parameters.

According to another aspect of the present invention, there is provided an apparatus to generate procedural textures for a plurality of natural phenomena. The apparatus includes: a parameter input unit which separately inputs a set of common parameters required to represent the plurality of natural phenomena and a set of specific parameters required to represent the physical properties of at least one of the plurality of natural phenomena; a texture generation unit which comprises a plurality of texture generators that generate a texture representing the natural phenomena; a noise generation unit which generates a noise value using the common parameters and the specific parameters, and transmits the noise value to the texture generation unit; and a texture determination unit which determines which procedural texture is to be generated according to the common parameters, and transmits the common parameters and the specific parameters to one of the texture generators according to the determination results.

According to another aspect of the present invention, there is provided at least one computer readable storing instructions that control at least one processor to perform a method of generating procedural textures for a plurality of natural phenomena, the method including: inputting a set of common parameters required to represent the plurality of natural phenomena; inputting a set of specific parameters required to represent physical properties of one of the natural phenomena; generating a noise value using the common parameters and the specific parameters; determining which procedural texture is to be generated according to the common parameters; and generating the procedural texture according to the determination results using the noise value, the common parameters, and the specific parameters.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
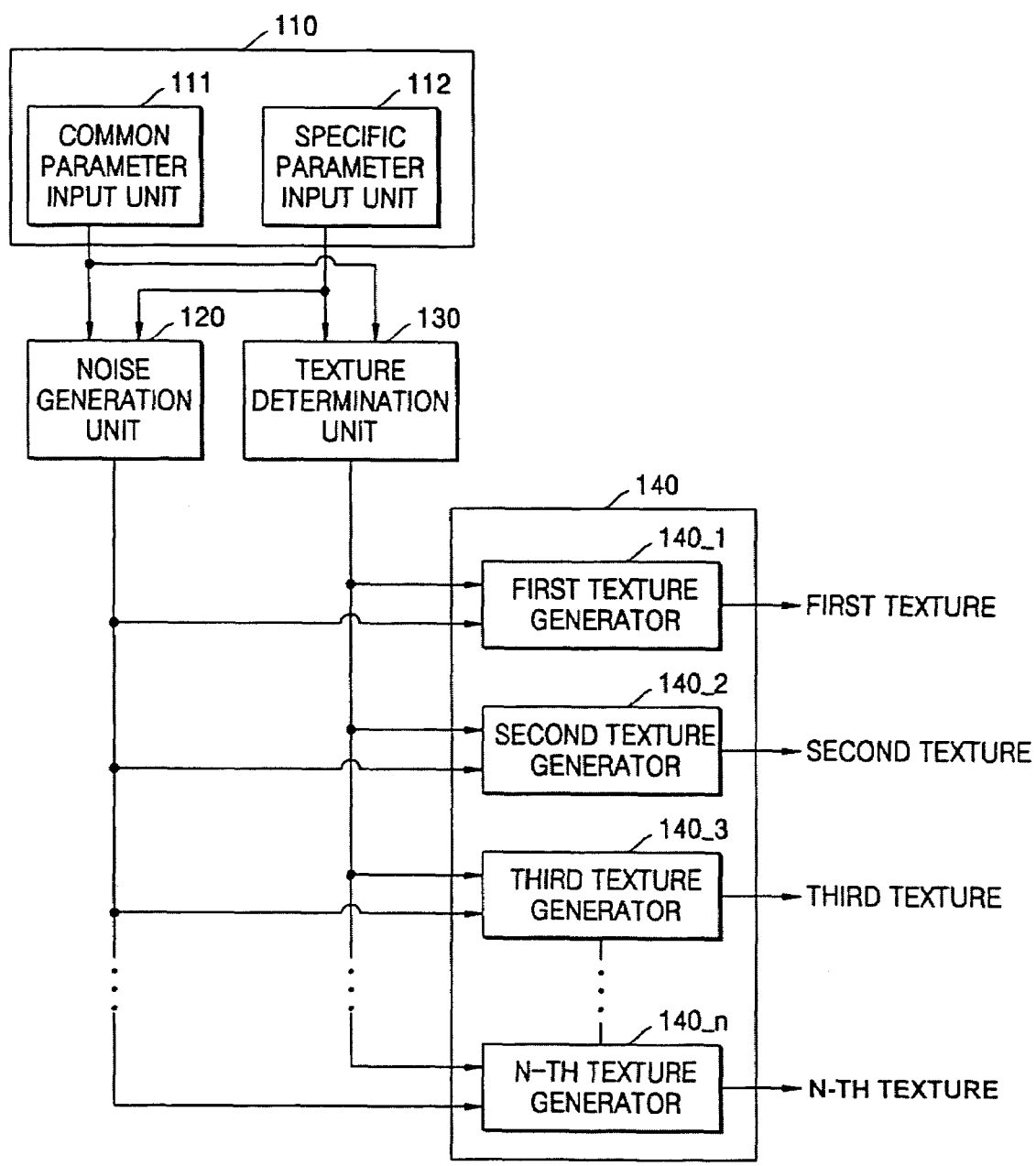
FIG. 1 is a block diagram illustrating an apparatus to generate a procedural texture for a natural phenomenon according to an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

FIG. 1 is a block diagram illustrating an apparatus to generate a procedural texture according to an embodiment of the present invention. Referring to FIG. 1, the apparatus includes a parameter input unit 110, a noise generation unit 120, a texture determination unit 130, and a texture generation unit 140.

The parameter input unit 110 includes a common parameter input unit 111 and a specific parameter input unit 112.

The common parameter input unit 111 inputs information regarding common parameters, required to generate procedural textures representing a plurality of natural phenomena, to the noise generation unit 120 and the texture determination unit 130. The common parameters may be defined as virtual reality modeling language (VRML) nodes, as shown in Table 1.

TABLE 1

| Field type | Field Name | Field Value and Range |
|---|---|---|
| SFInt32 | Side | 64 [2, 512] |
| SFFloat | StepU | 2.0 [0, ∞] |
| SFFloat | StepV | 2.0 [0, ∞] |
| SFFloat | StepW | 2.0 [0, ∞] |
| SFFloat | Scale | 1.0 [0, ∞] |
| SFVec2f | Offset | 0.0 [0, ∞] |
| SFInt32 | NumOctaves | 3 [1, ∞] |
| SFInt32 | UpdatePeriod | 30 [0, ∞] |
| ColorInterpolator | ColorSpline | Null |
| SFNode | TextureNode | Null |

Figure 2:
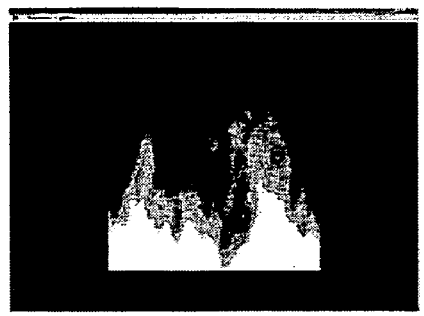
FIG. 2 illustrates procedural textures having different side values.
Figure 2:
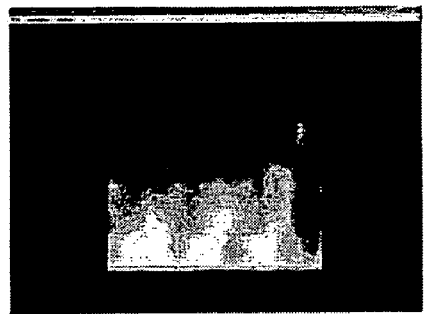

Referring to Table 1, a field side is a parameter indicating the size of a procedural texture in pixels, and is set to $2^n$, for example, 64. FIG. 2 is a diagram illustrating a comparison between a procedural texture having a side value of 64 ($=2^6$) and a procedural texture having a side value of 32 ($=2^5$).

Figure 3:
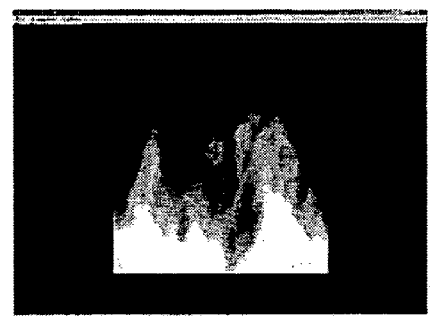
FIG. 3 illustrates procedural textures having different stepU values.
Figure 3:
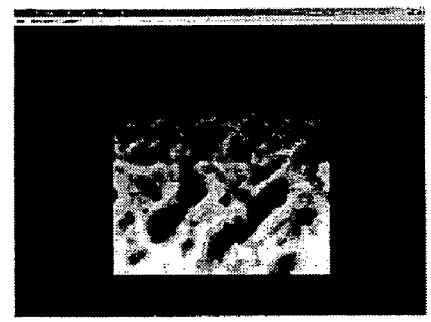

A field stepU is a parameter indicating an increase of a $1^{st}$ coordinate in a Perlin noise function for each pixel of a procedural texture to be created, and is set to 2.0, as shown in Table 1. FIG. 3 is a diagram illustrating a comparison between a procedural texture having a stepU value of 2.0 and a procedural texture having a stepU value of 10.0.

A field stepV is a parameter indicating an increase of a $2^{nd}$ coordinate in the Perlin noise function for each pixel of a procedural texture to be created. A field stepW is a parameter indicating an increase of a $3^{rd}$ coordinate in the Perlin noise function for each pixel of a procedural texture to be created.

Figure 4:
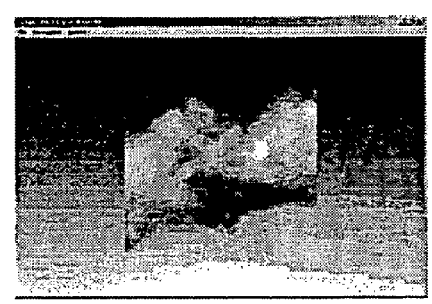
FIG. 4 illustrates procedural textures having different scale values.
Figure 4:

A field scale is a parameter for scaling up or down the size of an image to fit a created procedural texture. FIG. 4 is a diagram illustrating a comparison between a procedural texture having a scale value of 1.5 and a procedural texture having a scale value of 2.5.

Figure 5:
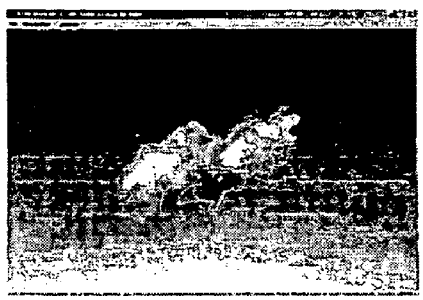
FIG. 5 illustrates procedural textures having different offset values.
Figure 5:
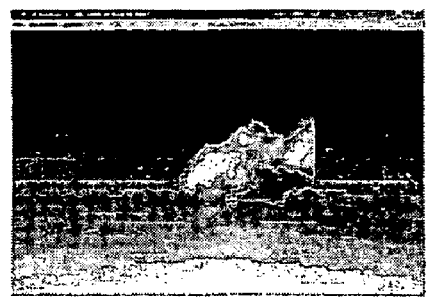

A field offset is a parameter for moving a created procedural texture. FIG. 5 is a diagram illustrating a comparison between a procedural texture having an offset value of (0, 0) and a procedural texture having an offset value of (0.7, 0).

Figure 6:
FIG. 6 illustrates procedural textures having different numOctaves values.
Figure 6:
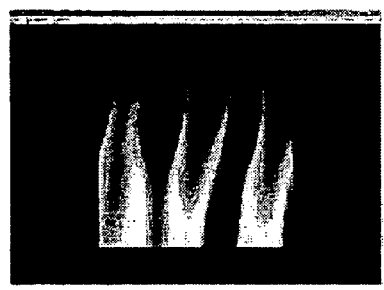
Figure 6:
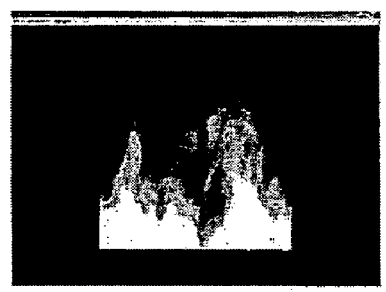

A field numOctaves is a parameter indicating the number of octaves for a standard Perlin's turbulence function. FIG. 6 is a diagram illustrating a comparison between a procedural texture having a numOctaves value of 0, a procedural texture having a numOctaves value of 1, and a procedural texture having a numOctaves value of 5.

A field updatePeriod is a parameter indicating the period, measured in milliseconds, for updating a procedural texture. A field colorSpline is a parameter that is used to produce a color value from a value returned by a calcTexel function. If colorSpline is set to Null, the value returned from the calcTexel function is used as the color value. Otherwise, the value returned from the calcTexel function is used by a colorSpline interpolator as an index value.

A field textureNode is a parameter specifying a node indicating the type of procedural texture that is to be created, and is set to one of the following texture node values: ProcTextureFire; ProcTextureSmoke; ProcTextureSteam; and ProcTextureCloud.

The specific parameter input unit 112 inputs the name of a specific texture node corresponding to each natural phenomenon, and a set of parameters required to represent the specific physical properties of each natural phenomenon, to the noise generation unit 120 and the texture determination unit 130. Table 2 shows a plurality of specific parameters needed to represent the physical properties of steam corresponding to the texture node ProcTextureSteam. The specific parameters may be defined as VRML nodes, as shown in Table 2.

TABLE 2

| Field Type | Field Name | Field Value and Range |
|---|---|---|
| SFFloat | radius | 0.5 [0.0, ∞] |
| SFFloat | heightRandomness | 0.2 [0.0, ∞] |
| SFFloat | maxDensity | 1.4 [0.0, ∞] |
| SFFloat | riseSpeed | 0.0001 [0.0, ∞] |
| SFFloat | expon | 7.5 [0.0, ∞] |
| SFVec2f | shadowOffset | −0.19 0.35 |

Figure 7:
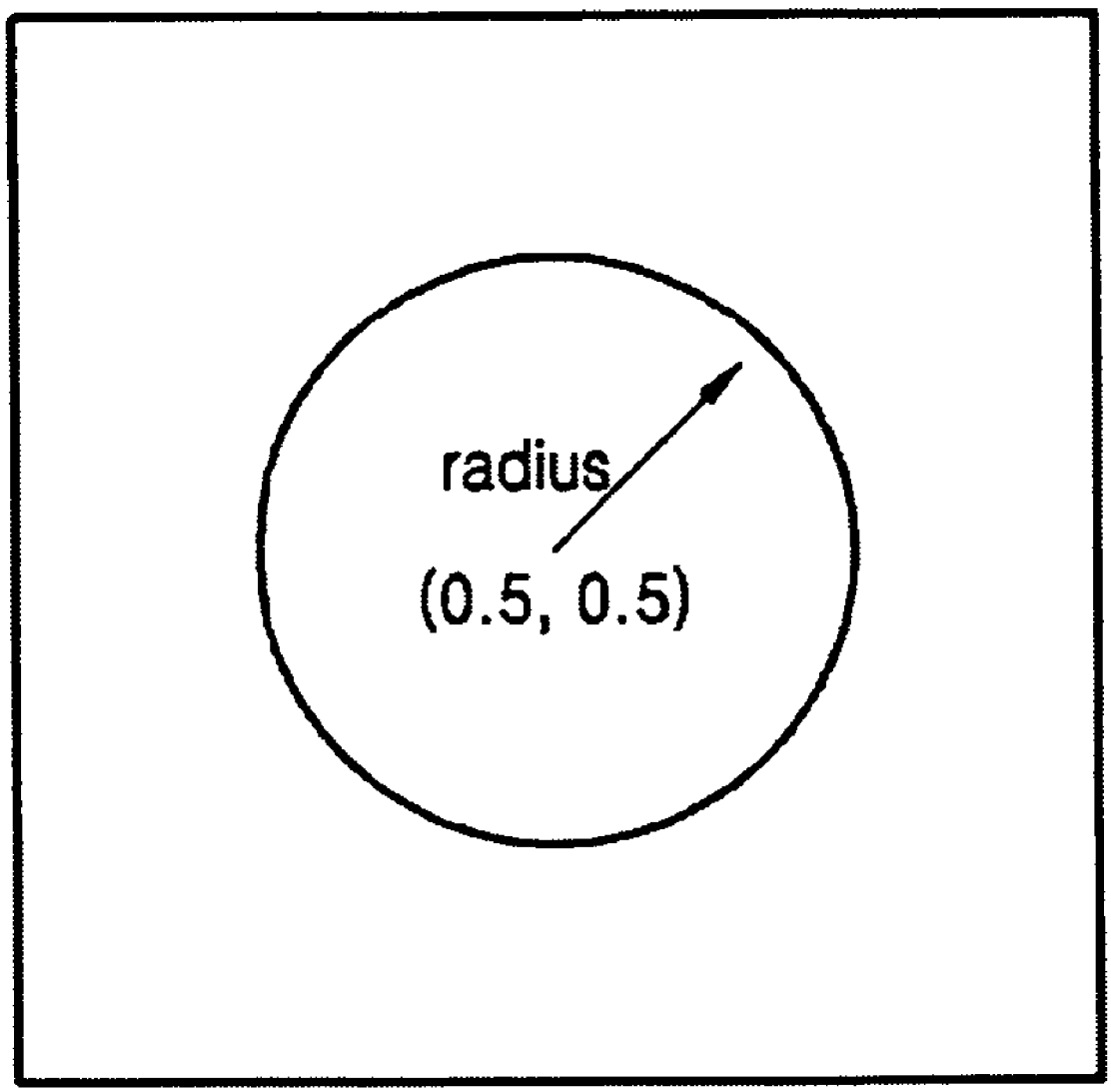
FIG. 7 is a diagram illustrating a sphere generated based on a radius value for steam.
Figure 8:
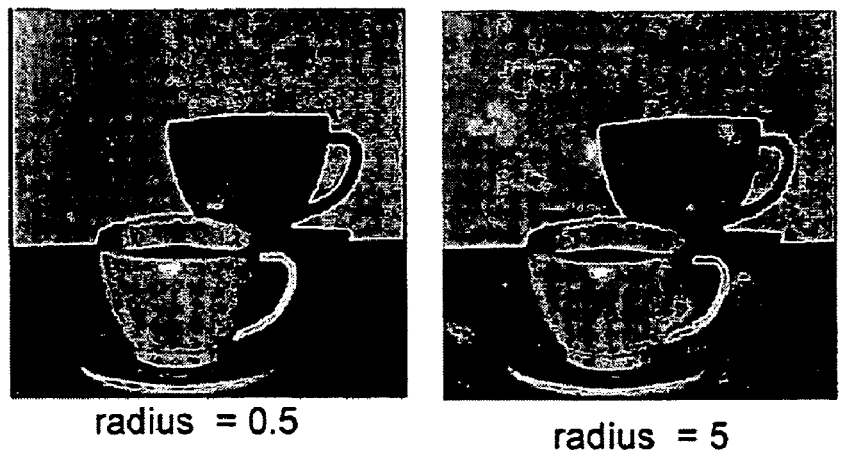
FIG. 8 illustrates procedural textures for steam having different radius values.

Referring to Table 2, a field radius is a parameter that indicates the radius of a sphere in which steam exists. FIG. 7 illustrates a sphere having a radius value of 0.5 in a texture square [0, 1]×[0, 1]. FIG. 8 is a diagram illustrating a comparison between a procedural texture having a radius value of 0.5 and a procedural texture having a radius value of 5, according to the sphere shown in FIG. 7.

A field heightRandomness is a parameter that sets the height at which the density of steam represented by a procedural texture begins to change. The field heightRandomness is used to illustrate the density of steam gradually decreasing while the steam rises. A field maxDensity is a parameter that sets a maximum density of the steam represented by a procedural texture. A field riseSpeed is a parameter that sets the speed at which the steam represented by a procedural texture rises.

Figure 9:
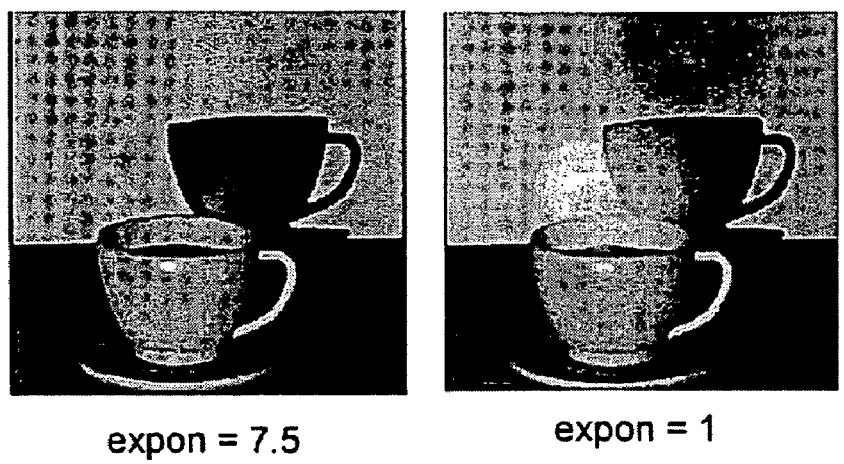
FIG. 9 illustrates procedural textures having different expon values.

A field expon is a parameter that sets the degree to which the steam represented by a procedural texture is divided into plumes. That is, the field expon is a parameter which varies the density of the steam. As the value of the field expon increases, the number of plumes of the steam increases. This is because the destiny of the steam increases when the value of the field expon increases. FIG. 9 is a diagram illustrating a comparison between a procedural texture having an expon value of 7.5 and a procedural texture having an expon value of 1.

A field shadowOffset is a parameter that sets the range of a shadow of the steam in the texture square [0, 1]×[0, 1] illustrated in FIG. 7. The field shadowOffset has two values, as defined in Table 2, including a first value indicating whether the shadow is located in front of or behind the steam, and a second value indicating whether the shadow is located on the left or right side of the steam.

For example, if the field shadowOffset is set to (0, 0.3), a procedural texture in which the shadow is located behind the steam is generated. If the field shadowOffset is set to (0, −0.3), a procedural texture in which the shadow is located in front of the steam is generated. If the field shadowOffset is set to (0.3, 0), a procedural texture in which the shadow is located on the left side of the steam is generated. If the field shadowOffset is set to (−0.3, 0), a procedural texture in which the shadow is on the right side of the steam is generated.

Table 3 shows a plurality of specific parameters needed to represent the physical properties of smoke corresponding to the texture node value ProcTextureSmoke. The specific parameters may be defined as VRML nodes, as shown in Table 3.

TABLE 3

| Field Type | Field Name | Field Value and Range |
|---|---|---|
| SFFloat | maxDensity | 0.9 [0, 1] |
| SFFloat | heightRampingOff | 0.7 [0, ∞] |
| SFFloat | heightZeroDensity | 1.2 [0, ∞] |
| SFFloat | heightAddTurbulence | 0 [0, ∞] |
| SFFloat | risingSpeed | 0.05 [0, ∞] |
| SFFloat | radius | 0.05 [0, ∞] |
| SFFloat | swirling | 0.3 [0, ∞] |
| SFFloat | disperse | 3.0 [0, ∞] |

Figure 10:
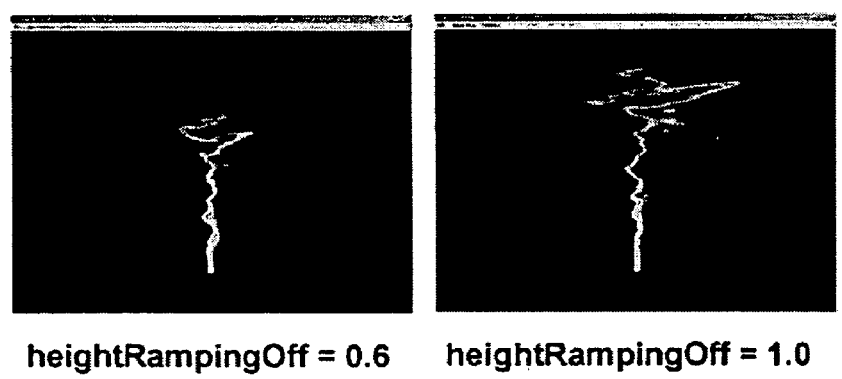
FIG. 10 illustrates procedural textures having different heightRampingOff values.

Referring to Table 3, a field maxDensity is a parameter indicating a maximum density of smoke represented by a procedural texture. A field heightRampingOff is a parameter indicating the height at which a ramping off of the density of the smoke represented by a procedural texture begins. For example, if the field heightRampingOff is set to 0.6, and the procedural texture size is 128 pixels, a procedural texture is generated in which the ramping off of the density of the smoke begins at a height of 77 pixels. FIG. 10 is a diagram illustrating a comparison between a procedural texture having a heightRampingOff value of 0.6 and a procedural texture having a heightRampingOff value of 1.0.

Figure 11:
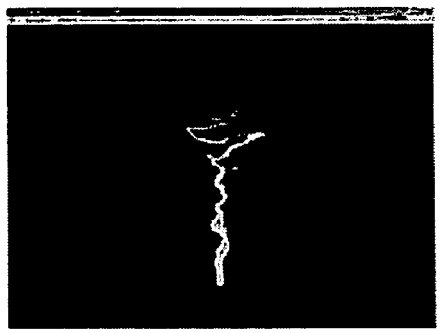
FIG. 11 illustrates procedural textures having heightAddTurbulence values.
Figure 11:
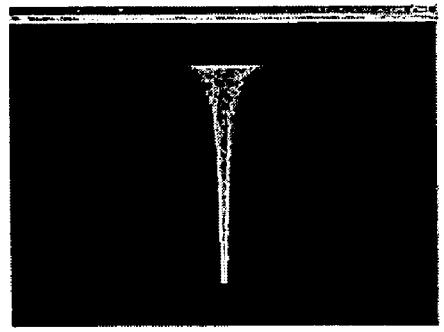

A field heightZeroDensity is a parameter indicating the height at which the ramping off of the density of the smoke represented by a procedural texture terminates. Accordingly, the field heightZeroDensity is set higher than the field heightRampingOff. A field heightAddTurbulence is a parameter indicating the height at which turbulence is added to the smoke. Accordingly, no noise effects are applied to the procedural texture below the height designated by the field heightAddTurbulence. FIG. 11 is a diagram illustrating a comparison between a procedural texture having a heightAddTurbulence value of 0 and a procedural texture having a heightAddTurbulence value of 1.

Figure 12:
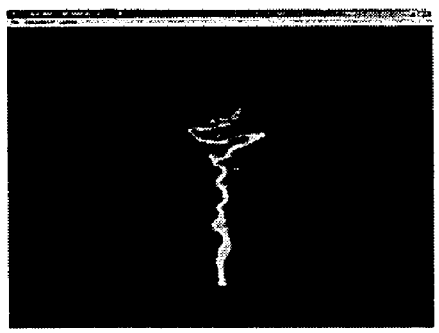
FIG. 12 illustrates procedural textures for smoke having different radius values.
Figure 12:
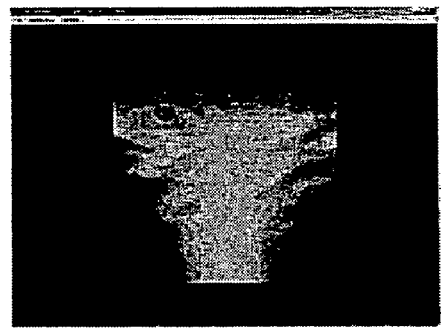

A field risingSpeed is a parameter indicating the speed at which the smoke rises. A field radius is a parameter indicating the radius of a smoke column relative to a width of a procedural texture. If the procedural texture width is 64 pixels and the field radius has a value of 0.05, the smoke column has a radius of three pixels. FIG. 12 is a diagram illustrating a comparison between a procedural texture having a radius value of 0.05 and a procedural texture having a radius value of 0.5.

Figure 13:
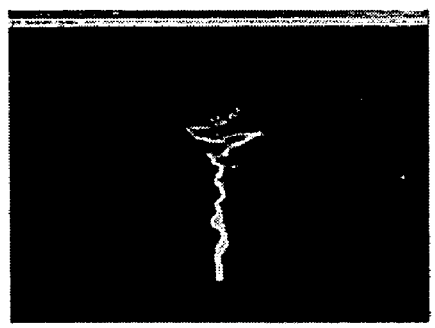
FIG. 13 illustrates procedural textures having different Swirling values.
Figure 13:
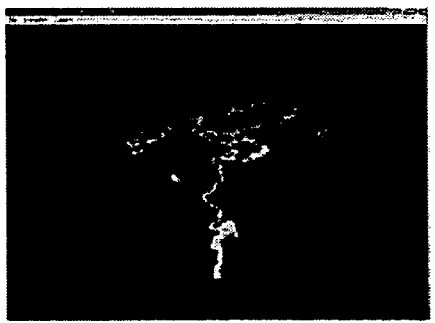

A field swirling is a parameter indicating the degree to which the smoke swirls about while rising. If the field swirling has a value of 0, a procedural texture in which smoke rises without swirling about is generated. FIG. 13 is a diagram illustrating a comparison between a procedural texture having a swirling value of 0.3 and a procedural texture having a swirling value of 0.9.

Figure 14:
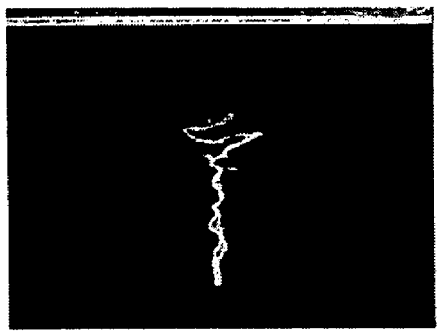
FIG. 14 illustrates procedural textures having different Disperse values.
Figure 14:
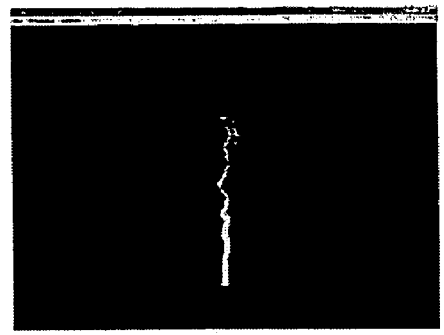

A field disperse is a parameter indicating the degree to which the smoke disperses while rising. If the field disperse has a value of 1, a procedural texture in which smoke rises without dispersing is generated. As the value of the field disperse increases, the amount by which the smoke disperses increases. FIG. 14 is a diagram illustrating a comparison between a procedural texture having a disperse value of 10 and a procedural texture having a disperse value of 1.

Table 4 shows a plurality of specific parameters needed to represent the physical properties of fire corresponding to the texture node ProcTexturefire. The specific parameters may be defined as VRML nodes, as shown in Table 4.

TABLE 4

| Field Type | Field Name | Field Value and Range |
| --- | --- | --- |
| SFFloat | riseSpeed | 0.5 [0, ∞] |
| SFFloat | heightWeight | 0.45 [0, 1] |
| SFFloat | noiseFactor | 5.0 [0, ∞] |
| SFFloat | bias | 0.8 [0, 1] |

Referring to Table 4, a field riseSpeed is a parameter that indicates the speed (pixels/sec) at which a flame rises. If the procedural texture size is 64 pixels and the field riseSpeed has a value of 0.2, a procedural texture in which a flame rises at a speed of 13 pixels/sec is generated.

A field heightWeight is a parameter indicating an acceleration of flame particles. If the field heightWeight has a value of 1, a procedural texture of a flame with thin peaks is generated.

Figure 15:
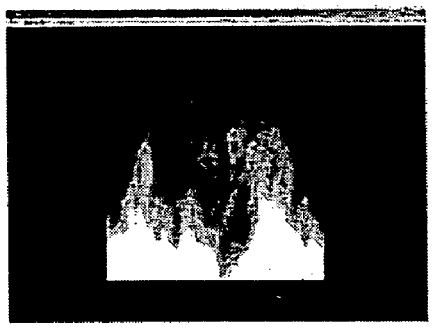
FIG. 15 illustrates procedural textures having different noiseFactor values.
Figure 15:
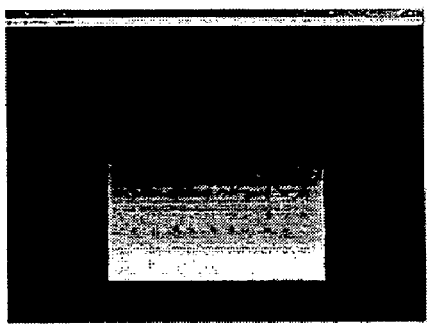

A field noiseFactor is a parameter that indicates the degree to which the boundary of a flame is jagged using a noise value. That is, the field noiseFactor is a parameter that specifies how noisy the fire is. As the value of the field noiseFactor increases, a rendered flame becomes a more realistic, highly jagged scroll. FIG. 15 is a diagram illustrating a comparison between a procedural texture having a noiseFactor value of 5 and a procedural texture having a noiseFactor value of 0.

A field bias is a parameter used to control opacity between a flame and the background.

Table 5 shows a plurality of specific parameters needed to represent the physical properties of a cloud corresponding to the texture node value ProcTextureCloud. The specific parameters may be defined as VRML nodes, as shown in Table 5.

TABLE 5

| Field Type | Field Name | Field Value and Range |
| --- | --- | --- |
| MFMetaball | primitives | [ ] |
| SFFloat | maxDensity | 0.2 [0, 1] |
| SFVec3f | lightDirection | 0 0 1 [−∞, ∞] |
| MFColor | lightColors | [ ] |
| SFFloat | expon | 0.5 [0, ∞] |
| SFFloat | densFactor | 0.4 [0, 1] |
| SFFloat | turbAmountCoef | 0.7 [0, ∞] |

Figure 16:
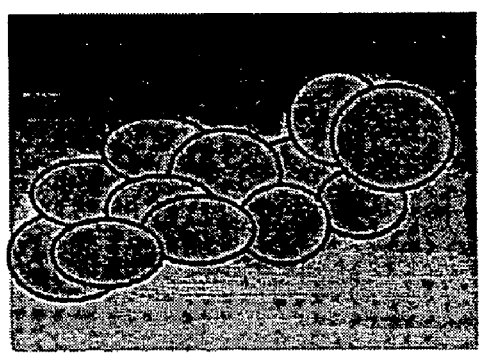
FIG. 16 is a diagram illustrating a plurality of metaballs representing a cloud.

Referring to Table 5, a field primitives is a parameter specifying the names of a plurality of metaballs representing a cloud. FIG. 16 illustrates examples of the metaballs representing a cloud. Table 6 shows a set of specific parameters needed to represent the physical properties of each of the metaballs representing a cloud, as illustrated in FIG. 16. The specific parameters may be defined as VRML nodes.

TABLE 6

| Field Type | Field Name | Field Value and Range |
| --- | --- | --- |
| SFVec3f | center | 0 0 0 [−∞, ∞] |
| SFVec3f | radii | 0 0 0 [0, ∞] |
| SFFloat | bigRadius | 0.0 [0, ∞] |
| SFFloat | weight | 0.0 [0, 1] |

Referring to Table 6, a field center is a parameter indicating the location of each of the metaballs, and a field radii is a parameter indicating the radii of the respective metaballs. A field bigRadius is a parameter indicating a maximum radius within which the density of the corresponding metaball can be distributed, and a field weight indicates a weight value used to calculate the density of the corresponding metaball. As the value of the field weight decreases, the density of the corresponding metaball decreases.

Referring to Table 5, a field maxDensity is a parameter indicating a maximum density of a cloud represented by a procedural texture. A field lightDirection is a parameter indicating the direction and intensity of light thrown on the cloud. A field lightColors is a parameter indicating the color of the light whose direction and intensity are specified by the field lightDirection. If the field lightDirection is empty or yet to be specified, the value of the field lightColors is ignored. If the field lightDirection has only one entry and the field lightColors is empty or yet to be specified, the light whose direction and intensity are specified by the field lightDirection is represented by a single element color. The single element is a light source.

If the field lightDirection has more than one entry, and the number of directions specified by the field lightDirection is equal to the number of colors specified by the field lightColors, it is assumed that there are N light sources, in which case, the color of a j-th light source is specified by lightColors[j], and the intensity and direction of the j-th light source are specified by lightDirection[j].

Figure 17:
FIG. 17 illustrates procedural textures having different expon values.
Figure 17:

A field expon is a parameter indicating the degree to which the cloud is divided into plumes. FIG. 17 is a diagram illustrating a comparison between a procedural texture having an expon value of 0.9 and a procedural texture having an expon value of 0.0.

A field densFactor is a blending parameter which is blended between the metaball density and the product of the metaball density and turbulence density of a cloud represented by a procedural texture. As the value of the field densFactor increases, the shape of the cloud represented by a procedural texture becomes clearer. A field turbAmountCoef is a parameter indicating a noise value to be added to a current position of a pixel before calculating the density defined by the cloud microstructure (or turbulence).

Referring to FIG. 1, the noise generation unit 120 may generate a Perlin noise value by applying the common parameters input by the common parameter input unit 111 and the specific parameters input by the specific parameter input unit 112 to a Perlin noise function. A Perlin noise value may be an integer value between 0 and 255. However, the Perlin noise value may be an integer value within a range other than the range from 0 to 255.

The noise generation unit 120 generates the Perlin noise value based on the input common parameters and the input specific parameters. Thus, the Perlin noise value reflects noise and the physical properties of a natural phenomenon specified by the input common parameters and the input specific parameters. The Perlin noise value is provided to first through n-th texture generators 140_1 through 140_n of the texture generation unit 140. Although the embodiment of the texture generation unit 140 is illustrated in FIG. 1 as having four texture generators, there may be up to n texture generators included in the texture generation unit 140.

The texture determination unit 130 receives the common parameters transmitted by the common parameter input unit 111 and the specific parameters transmitted by the specific parameter input unit 112, analyzes a texture node specified by the input common parameters, and determines which of the first through n-th textures need to be generated for the analyzed texture node according to the analysis results. The first through n-th textures may represent different natural phenomena. For example, the first texture can represent steam, the second texture can represent smoke, the third texture can represent a flame, and the n-th texture can represent a cloud.

The texture determination unit 130 transmits the input common parameters and the input specific parameters to one of the first through n-th texture generators 140_1 through 140_n according to the determination results. If the analysis results indicate that the analyzed texture node corresponds to the first texture, the texture determination unit 130 transmits the input common parameters and the input specific parameters to the first texture generator 140_1. If the analysis results indicate that the analyzed texture node corresponds to the second texture, the texture determination unit 130 transmits the input common parameters and the input specific parameters to the second texture generator 140_2. If the analysis results indicate that the analyzed texture node corresponds to the third texture, the texture determination unit 130 transmits the input common parameters and the input specific parameters to the third texture generator 140_3. If the analysis results indicate that the analyzed texture node corresponds to the n-th texture, the texture determination unit 130 transmits the input common parameters and the input specific parameters to the n-th texture generator 140_n.

The texture generation unit 140 includes the first through n-th texture generators 140_1 through 140_n, and generates one or more procedural textures. The first through n-th texture generators 140_1 through 140_n generate different textures. In detail, the first texture generator 140_1 may generate a texture representing steam, the second texture generator 140_2 may generate a texture representing smoke, the third texture generator 140_3 may generate a texture representing a flame, and the n-th texture generator 140_n may generate a texture representing a cloud.

If the determination results obtained by the texture determination unit 130 indicate that a procedural texture representing steam needs to be generated, then the first texture generator 140_1 may generate a texture representing steam according to the common parameters and the specific parameters input by the texture determination unit 130 and the Perlin noise value from the noise generation unit 120.

In detail, during the generation of the texture representing steam, the first texture generator 140_1 alters the 2D position of a texel (i, j) according to the Perlin noise value input from the noise generation unit 120. Thereafter, the first texture generator 140_1 calculates a steam rising distance down indicating the distance in texels by which steam represented by the texel (i, j) rises in a texture to be generated by multiplying the value of the input specific parameter riseSpeed by a predetermined time value time set in advance using Equation (1):

$$\text{down} = \text{riseSpeed} \times \text{time} \tag{1}$$

3D noise vectors iNew, jNew, and kNew are obtained from the 2D location of the texel (i, j) by applying the Perlin noise value noise, the steam rising distance down, and a predetermined value θ set in advance to Equation (2):

$$i\text{New} = i + \text{noise} + \cos(\theta) \times \alpha$$

$$j\text{New} = j + \text{noise} + \text{down}$$

$$k\text{New} = -0.5 + \text{noise} + \sin(\theta) \times \alpha \tag{2}$$

wherein α is a constant that is experimentally determined and may be set to, for example, 0.13, the value θ may be predetermined by 0.0003*times (the times representing time values used for the cosine and sine functions, which are multiplied by a number such as 0.0003 to delay the times), and −0.5 is a value of a distance indicating depth of the steam represented on a screen. A value of −0.5 in Equation (2) indicates that a user feels more depth on the screen than an object which generates the steam by 0.5 texels.

The first texture generator 140_1 obtains a turbulence value turb for the 3D noise vectors iNew, jNew, and kNew using Equation (3):

$$\text{turb}(x, y, z, N) = \sum_{i=0}^{N-1} \frac{\text{perlin}(2^i x, 2^i y, 2^i z)}{2^i} \tag{3}$$

wherein x, y, and z are 3D coordinates respectively corresponding to the 3D noise vectors iNew, jNew, and kNew, N is the value of the input common parameter numOctaves, perlin $(2^i x, 2^i y, 2^i z)$ is a Perlin noise value input by a 3D noise function, i is the number of Perlin noise values, and turb(x, y, z, N) is the sum of the i Perlin noise values and is within a range [0, 1].

A first density dens 1 of the steam represented by the texel (i, j) is obtained by applying the turbulence value turb obtained by Equation (3) and the values of the input specific parameters maxDensity and expon to Equation (4);

$$\text{dens1} = (\text{turb} \times \text{maxDensity})^{expon} \tag{4}$$

The first texture generator 140_1 determines a steam formation range by calculating a first distance distFromCenter1 between the texel (i, j) to be created and the center of the texture using Equation (5):

$$\text{distFromCenter1} = \frac{(i - 0.5)^2 + (j - 0.5)^2}{\text{radius}^2}. \tag{5}$$

In Equation (5), it is assumed that the center of the texture is (0.5, 0.5).

Thereafter, the first texture generator 140_1 obtains a second distance distFromCenter2 between the texel (i, j) to be created and the center of the texture by applying a noise value to the steam formation range using Equation (6):

$$\text{distFromCenter2} = \text{distFromCenter1} + \beta \times (\text{turb} - 0.5) \tag{6}$$

wherein β is a constant that is experimentally determined and may be set to, for example, 0.8.

If the second distance distFromCenter2 is greater than a predetermined value, for example, 0.01, the second distance is attenuated by cosine law, thereby obtaining t1, which is a parameter indicating the degree to which the density of the steam represented by the texel (i, j) decreases while the steam represented by the texel (i, j) rises, and is represented by Equation (7):

$$t1 = \min\left(\frac{\text{distFromCenter2} - 0.01}{1 - 0.01}, 1\right) \times \pi \tag{7}$$

wherein 0.01 is an experimentally determined value.

Thereafter, the first texture generator 140_1 calculates a second density dens2 of the steam represented by the texel (i, j) by applying the coordinates of the center of the texture, the first density dens1, and t1 to Equation (8):

$$\text{dens2} = \text{dens1} \times 0.5 \times (1 + \cos(t1)) \tag{8}$$

Thereafter, the first texture generator 140_1 determines a height value height through attenuation using Equation (9):

$$\text{height} = j - 0.5 \tag{9}$$

If the height value height is determined to be less than 0, it appears that the texel (i, j) to be created is located above the center of the texture. A value howHigh, indicating the height at which noise is applied, is determined by applying the input specific parameter heightRandomness to Equation (10):

$$howHigh = \frac{height}{radius} + heightRandomness \times (turb - 0.5) \qquad (10)$$

wherein 0.5 is a coordinate of the center of the texture.

If the value howHigh is greater than 0, the first texture generator 140_1 sets t2 to the lower of the values howHigh and 1, and obtains t3 through exponential attenuation of t2 as indicated in Equation (11):

$$t2 = \min(howhigh, 1) \qquad (11)$$

$$t3 = 1 - \frac{e^{t2} - 1}{e^1 - 1}$$

wherein t2 and t3 are height values.

A third density dens3 of the steam represented by the texel (i, j) is obtained by exponentially attenuating the second density dens2 of the steam represented by the texel (i, j), and is represented by Equation (12):

$$dens3 = dens2 \times t3 \qquad (12).$$

The first texture generator 140_1 outputs a value determined by applying the third density dens3 to (min(max (dens3, 0) 1)) as a value of the texel (i, j). In other words, if the third density dens3 is greater than 0 and less than 1, the first texture generator 140_1 selects the third density dens3. However, if the third density dens3 is smaller than 0, the first texture generator 140_1 selects 0, if the third density value dens3 is greater than 1, the first texture generator 140_1 outputs 1 as the value of the texel (i, j).

In short, the first texture generator 140_1 calculates the density of the steam represented by the texel (i, j) in a plurality of stages. Thus, the first texture generator 140_1 can generate a procedural texture comprised of a plurality of texels that can sufficiently reflect the physical properties of a specific natural phenomenon such as steam. The procedural texture from the first texture generator 140_1 is a first texture.

Figure 18:
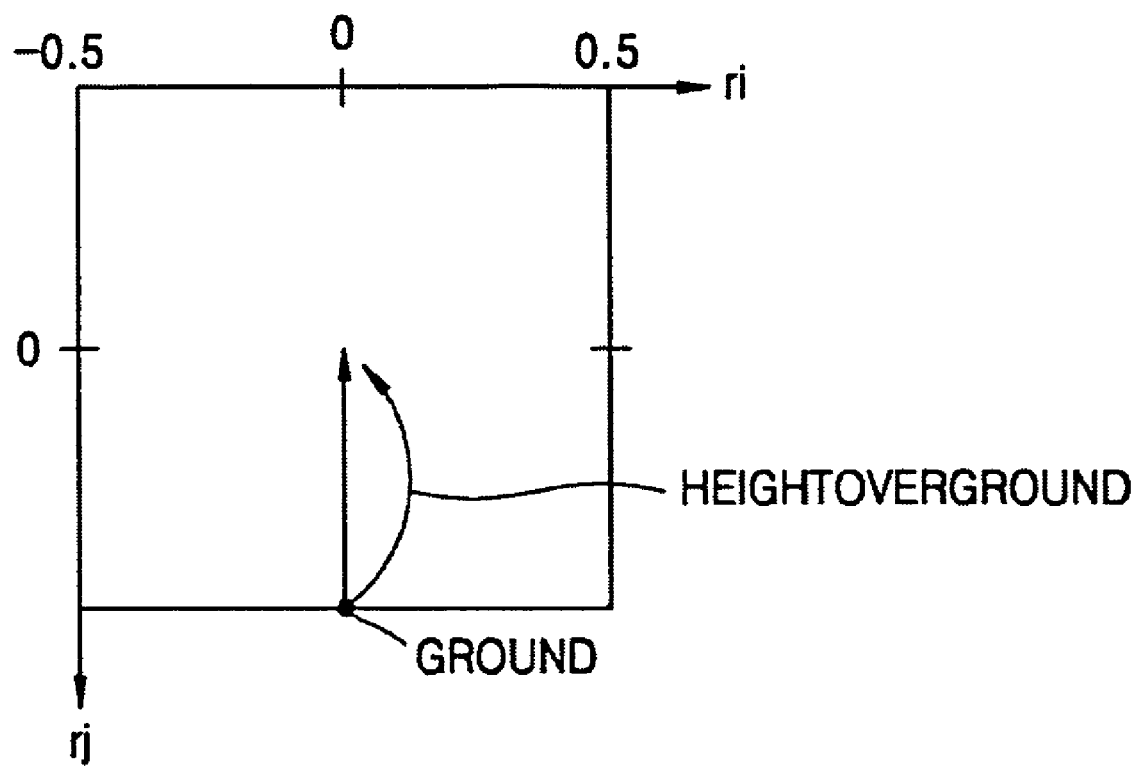
FIG. 18 is a diagram illustrating the range for generating a texture for smoke.

If the determination results obtained by the texture determination unit 130 indicate that a procedural texture representing smoke needs to be generated, then the second texture generator 140_2 generates a texture representing smoke according to the common parameters and the specific parameters input by the texture determination unit 130 and the Perlin noise value from the noise generation unit 120. In detail, during the generation of the texture representing smoke, the second texture generator 140_2 may calculate the density of smoke represented by a texel $(r_i, r_j)$ of a second texture normalized at a current moment of time to be within a previously set range [−0.5, 0.5], as illustrated in FIG. 18. In order to calculate the density of the smoke represented by the texel $(r_i, r_j)$, the second texture generator 140_2 calculates $r_i$ of the texel $(r_i, r_j)$ as the smoke rises by applying the value of the input specific parameter disperse to the texel $(r_i, r_j)$ as indicated in Equation (13):

$$r_i = r_i \times (1 - disperse) \times r_j + 0.5 \times (1 + disperse) \qquad (13)$$

wherein 0.5 is a value indicating the location of a ground level Ground in a predetermined range illustrated in FIG. 18, and $r_i$ and $r_j$ are coordinates indicating the 2D location of the texel.

Thereafter, the second texture generator 140_2 calculates a swirling angle θ using a time value determined in advance, and then calculates sin_θ and cos_θ in order to determine the extent to which the smoke represented by the texel $(r_i, r_j)$ swirls.

Thereafter, the second texture generator 140_2 calculates a smoke rising distance down by multiplying the value of the input specific parameter risingSpeed by the time value. Here, the smoke rising distance down indicates the distance by which the smoke represented by the texel $(r_i, r_j)$ rises, and is related to the speed at which the smoke represented by the texel $(r_i, r_j)$ rises. In addition, the second texture generator 140_2 calculates the height heightOverGround of the texel $(r_i, r_j)$ from the ground level Ground of FIG. 18 by subtracting $r_j$ from 0.5, as represented by Equation (14):

$$heightOverGround = 0.5 - r_j \qquad (14)$$

wherein heightOverGround is a value between 0 and 1.

The second texture generator 140_2 obtains a height value hei01 using the height heightOverGround and the value of the input specific parameter heightAddTurbulence as indicated in Equation (15):

$$hei01 = \max(0, heightOverGround - heightAddTurbulence) \qquad (15)$$

Figure 19A:
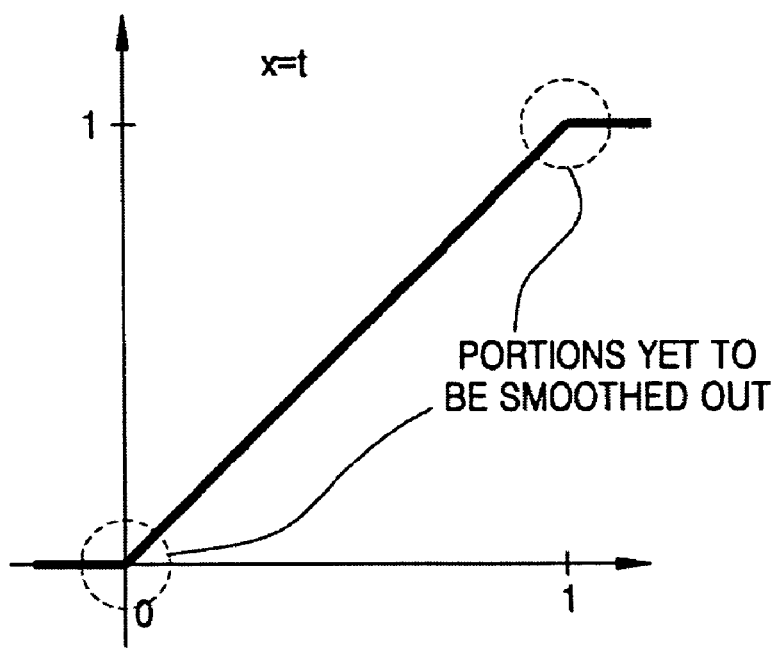
FIG. 19A is a diagram illustrating the variation of a t_ease value before an ease function is applied thereto.
Figure 19B:
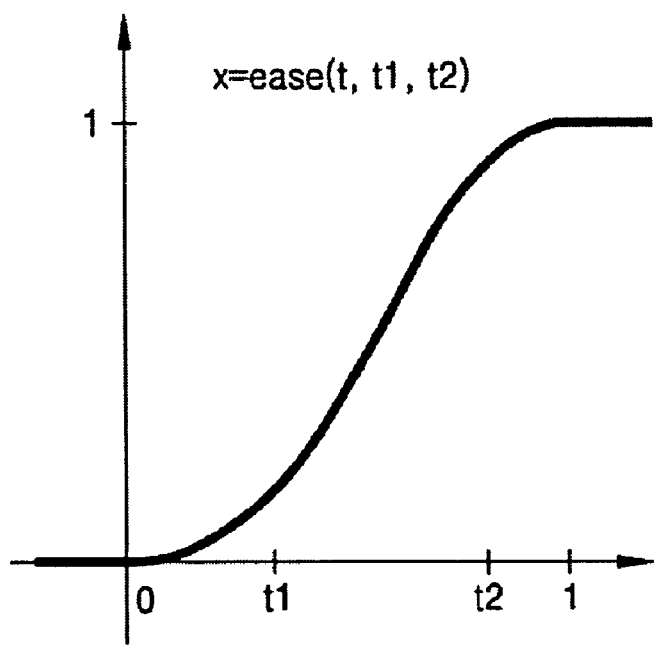
FIG. 19B is a diagram illustrating the variation of the t_ease value after the ease function is applied thereto.

Thereafter, the second texture generator 140_2 obtains an ease function value t_ease by dividing hei01 by a predetermined value, for example, 0.8, and differentiates a case in which the ease function value t_ease is greater than 1 from a case in which the ease function valued t_ease is smaller than 1. If the ease function value t_ease is greater than 1, noise is added, thereby producing a turbulence effect in which the smoke represented by the texel $(r_i, r_j)$ is rendered as scattering in the air. For a smooth transition between an area where noise is added to an area where no noise is added, the ease function value t_ease is smoothed out using an ease function ease( ) as indicated in Equation (16):

$$t = \int t\_ease$$

$$t\_ease = t + ease(t\_ease - t, 0.001, 0.999)$$

$$t\_ease = \min(t\_ease, 2.5) \qquad (16)$$

wherein 0.001, 0.999, and 2.5 are experimentally determined values. Experimental values other than 0.001, 0.999, and 2.5 may be used to calculate the ease function value t_ease. If the ease function value t_ease is 1.45, t is 1 (sec) because t is an integer rounded from the ease function value t_ease. If the ease function value t_ease is 0.45, t is 0. The ease function ease( ) is a non-linear function that smoothes a non-linear relationship between an input value and an output value, as illustrated in FIGS. 19A and 19B. Referring to FIG. 19A, the slope of a graph drastically changes at the points t=0 and t=1. The ease function ease( ) eases the slope changes illustrated in the graph of FIG. 19A into the smoother slope changes illustrated in the graph of FIG. 19B. Referring to FIG. 19B, x=ease(t, t1, t2), where t, t1, and t2 are input parameters of the ease function ease( ), and t1 and t2 serve their functions when 0<t<1.

If the ease function value t_ease is less than 1, it is redefined, as shown in Equation (17), so that the turbulence effect weakens:

$$t\_ease = ease(t\_ease, 0.5, 0.999) \qquad (17).$$

Once the ease function value t_ease is redefined, the second texture generator 140_2 obtains a parameter ta that is used to vary the amount of turbulence according to height, as shown in Equations (19) and (20), by using the original ease function value t_ease obtained from Equation (16), or the redefined ease function value t_ease obtained from Equation (17), as indicated in Equation (18):

$$ta = 1 + \gamma * (t\_ease - 1) \quad (18)$$

wherein $\gamma$ is a coefficient that is experimentally determined and may be set to, for example, 0.8.

Thereafter, the second texture generator 140_2 calculates a turbulence value turb by applying the value of the parameter swirling and the value of the parameter rising to Equation (19):

$$\text{turb} = \text{turbulence}(r_j + 0.5 - \text{down}, r_i + 0.5 + \cos\_\theta, \sin\theta) \quad (19)$$

Thereafter, the second texture generator 140_2 alters the turbulence value turb by using the ease function value t_ease as indicated in Equation (20):

$$\text{path\_turb} = \text{turb} \times ta$$

$$\text{turb\_amount} = \text{path}_{\_turb\_\delta} \times ta \quad (20)$$

wherein path_turb indicates the generating path of turbulence, turb_amount indicates the amount of turbulence, and $\delta$ is a coefficient that is experimentally determined and may be set to, for example, 0.875.

Thereafter, the second texture generator 140_2 calculates a height hei01' using the turbulence amount turb_amount as indicated in Equation (21):

$$\text{hei01}' = \text{hei01} + 0.1 \times \text{turb\_amount} \quad (21)$$

If the value of the height hei01' is greater than the value of the input specific parameter heightZeroDensity, the second texture generator 140_2 calculates a smoke radius rad_sq using Equation (22):

$$\text{rad\_sq} = \text{radius}^2 \quad (22)$$

Further, if the value of the height hei01' is less than 0, the second texture generator 140_2 calculates a smoke radius rad_sq2 using Equation (23):

$$\text{rad\_sq2} = \text{rad\_sq} \times 0.25 \quad (23)$$

On the other hand, if the value of the height hei01' is not less than 0, the second texture generator 140_2 calculates the smoke radius rad_sq2 using Equation (24):

$$\text{rad\_sq2} = \left( \frac{0.5 + 0.5 \times \text{ease}}{\left(\frac{\text{hei01}}{1.75 \times \text{heightZeroDensity}}, 0.5, 0.5\right)} \right) \times \text{radius} \quad (24)$$

$$= \text{rad\_sq2}^2.$$

The second texture generator 140_2 calculates 2D vector directions direction.x and direction.y, in which the location of the texel $(r_i, r_j)$ swirls, using Equation (25):

$$\text{direction}.x = r_i + \text{hel\_path}\_x$$

$$\text{direction}.y = \text{hel\_path}\_z \quad (25)$$

Values hel_path_x and hel_path_z are obtained from Equation (26):

$$\text{my\_path\_turb} = (2 \times \text{turb} - 1) \times \text{hei01} \times 1.3$$

$$r\sin = \sin((\text{heightOverGround} + \text{down} \times m\_\text{downCoeff}) \times se2PI)$$

$$r\cos = \cos((\text{heightOverGround} + \text{down} \times m\_\text{downCoeff}) \times se2PI)$$

$$t = (1 + \text{path\_turb}) \times (1 + t\_\text{ease} \times 0.1)$$

$$\text{hel\_path}\_x = \cos\_\theta 2 \times t \times (1 + r\cos \times 0.11) + \text{swirling} \times \text{my\_path\_turb}$$

$$\text{hel\_path}\_z = \sin\_\theta 2 \times t \times (1 + r\sin \times 0.085) + 0.03 \times \text{path\_turb} \quad (26)$$

wherein 1.3, 0.1, 0.11, 0.085, and 0.03 are coefficients that are experimentally determined. Experimental values other than 1.3, 0.1, 0.11, 0.085, and 0.03 can be used as coefficients to calculate the values hel_path_x and hel_path_z.

The second texture generator 140_2 calculates a square distance dist_sq between the texel $(r_i, r_j)$ and the center of a smoke column using Equation (27):

$$\text{dist\_sq} = |\text{center} - \text{direction}|^2 \quad (27)$$

wherein direction is the 2D position of the texel $(r_i, r_j)$ defined by the 2D vector directions direction.x and direction.y.

If the square distance dist_sq is greater than the smoke radius squared rad_sq$2^2$, the texel $(r_i, r_j)$ is too distant from the center of the smoke column, and, thus, the second texture generator 140_2 outputs 0 as a value of the texel $(r_i, r_j)$.

However, if the square distance dist_sq is not greater than the smoke radius squared rad_sq$2^2$, the second texture generator 140_2 calculates a first height-dependent density ret of the smoke represented by a texel $(r_i, r_j)$ using Equation (28):

$$ret = \left( \frac{1 - \text{dist\_sq}}{\text{rad\_sq}2^2} + \text{turb} \times 0.05 \right) \times \text{maxDensity} \quad (28)$$

wherein 0.05 is a coefficient that is experimentally determined. A value other than 0.05 can be used as a coefficient to calculate the first height-dependent smoke density ret.

If the value of the height hei01' is greater than the value of the input specific parameter heightRampingOff, the second texture generator 140_2 calculates a second height-dependent smoke density ret' of the smoke represented by a texel $(r_i, r_j)$ using the first height-dependent density ret as indicated in Equation (29):

$$ret' = ret \times \left( \left( \frac{1 - \text{ease}}{\frac{\text{hei01} - \text{heightRampingOff}}{\text{heightZeroDensity} - \text{heightRampingOff}}}, 0.5, 0.5 \right) \right). \quad (29)$$

The second texture generator 140_2 outputs the first or second height-dependent density ret or ret' as the value of the texel $(r_i, r_j)$.

If the determination results obtained by the texture determination unit 130 indicate that a procedural texture representing fire needs to be generated, then the third texture generator 140_3 may generate a texture representing fire according to the common parameters and the specific parameters input by the texture determination unit 130 and the Perlin noise value from the noise generation unit 120. In detail, during the generation of the texture representing fire, in order to calculate the density or temperature of a flame represented by a pixel (i, j) using a function calcColor, the third texture generator 140_3 calculates a first height heightOverGround of the pixel (i, j) from the ground first using Equation (30):

$$\text{heightOverGround} = 1 - j \quad (30).$$

Thereafter, the third texture generator 140_3 calculates the acceleration of the texture at the texel (i, j) using the values of the input specific parameters riseSpeed and heightWeight as indicated in Equation (31):

$$j = j + \text{time} \times \text{riseSpeed} - j \times \text{heightWeight} \quad (31).$$

Thereafter, the third texture generator 140_3 calculates a turbulence value turb within a range [−0.5, 0.5]. Thereafter, the third texture generator 140_3 calculates a second height heightOverGround' of the pixel (i, j) from the ground using the value of the input specific parameter noiseFactor, the turbulence value turb, and the first height heightOverGround of the pixel (i, j) from the ground as indicated in Equation (32):

$$\text{heightOverGround}' = \text{heightOverGround} + \text{noiseFactor} \times \text{turb} \quad (32).$$

Thereafter, the third texture generator 140_3 calculates the density density of the flame represented by the texture at the pixel (i, j) using the second height heightOverGround' of the pixel (i, j) from the ground as indicated in Equation (33):

$$\text{density} = 1 - \text{heightOverGround}' \quad (33).$$

The density density is used to interpolation in colorSpline to obtain color of pixel (I, j).

Thereafter, the third texture generator 140_3 calculates the RGB color Color and opacity Opacity of the pixel (i, j) using the density density at the pixel (i, j) as indicated in Equation (34):

$$\text{Color} = \text{ColorSpline}(\text{density})$$

$$\text{Opacity} = \text{Bias}_{bias}(\text{density}) \quad (34)$$

If the determination results obtained by the texture determination unit 130 indicate that a procedural texture representing a cloud needs to be generated, then the n-th texture generator 140_n may generate a texture representing a cloud according to the common parameters and the specific parameters input by the texture determination unit 130 and the Perlin noise value from the noise generation unit 120. In detail, during the generation of the texture representing a cloud, the n-th texture generator 140_n obtains the density of a cloud represented by a texel T (x, y, z) of a 3D texture by blending an internal density $d_i$ of the cloud represented by the texel T (x, y, z) and a turbulence density $d_t$ of the cloud represented by the texel T (x, y, z). Here, the internal density $d_i$ is defined by a cloud macrostructure comprised of a set of metaballs, which are ellipsoids having specified float weights, as illustrated in FIG. 16, while the turbulence density $d_t$ is defined by a cloud microstructure (or turbulence).

A random value for the turbulence density $d_t$ is then obtained. The density $d_t$ is within a range [0, 1]. The n-th texture generator 140_n transforms the random value into a space within a range [−turbAmountCoef, turbAmountCoef] using Equation (35):

$$t = \text{turbAmountCoef} \times (2 \times d_t - 1) \quad (35).$$

Thereafter, the coordinates x, y, and z of the texel T are disturbed using a transformation coefficient t as indicated in Equation (36):

$$x = x + t, \ y = y - t, \ z = z + t \quad (36).$$

Thereafter, the internal density d is calculated using Equation (37):

$$d_i = d_i + d_{metaball}(x, y, z) \quad (37).$$

Thereafter, the internal density $d_i$ and the turbulence density $d_t$ are blended, thereby obtaining the blended density ret as indicated in Equation (38):

$$\text{ret} = d_i \times \text{maxDensity} \times (1 \times \text{densFactor} \times d_t) \quad (38).$$

Thereafter, an exponentially attenuated density d of the cloud represented by the texel T (x, y, z) is obtained by raising the blended density ret to the power of expon as indicated in Equation (39):

$$d = \text{ret}^{expon} \quad (39).$$

Figure 20:
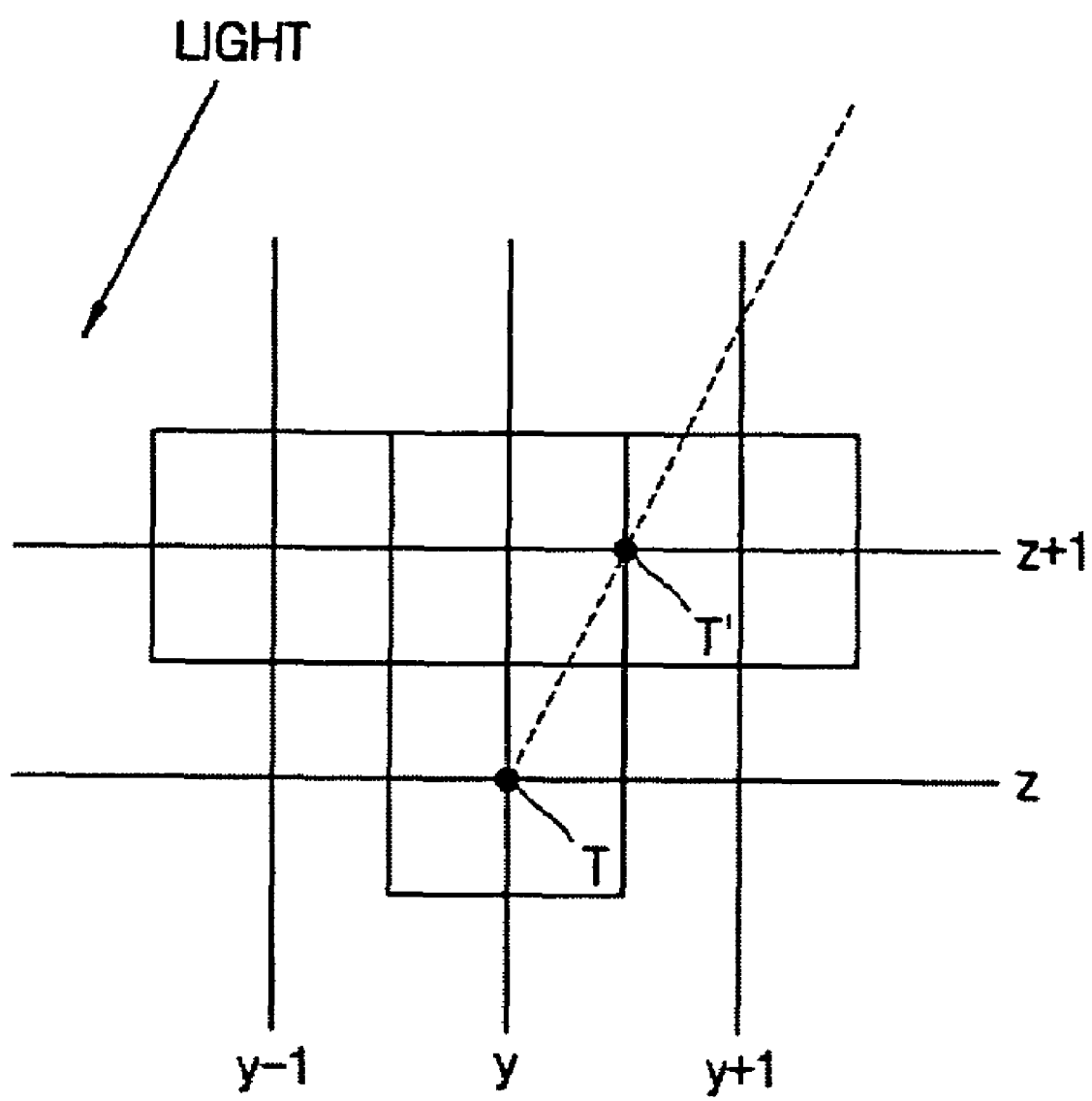
FIG. 20 is a diagram illustrating the calculation of a color of a texel of a 3D texture based on the density at each texel of the 3D texture and the direction and intensity of light incident on the 3D texture.

Thereafter, the color of the texel T (x, y, z) of the 3D texture is calculated according to the exponentially attenuated density d and the direction and intensity of light thrown on the 3D texture. Referring to FIG. 20, in order to calculate the color of the texel T (x, y, z), it is determined, through backward light vector tracking, which of a plurality of texels on a (z+1)-th layer intersects an extension of a light vector of the texel T (x, y, z) on a z-th layer. Here, the (z+1)-th layer is located behind the z-th layer, and has a considerable effect on the z-th layer.

If the determination results indicate that a texel T' (xx, yy, z+1) is the intersection between the (z+1)-th layer and the extension of the light vector of the texel T (x, y, z), it appears that four texels having different angles, i.e., T1 ([xx], [yy], z+1), T2 ([xx]+1, [yy], z+1), T3 ([xx], [yy]+1, z+1), and T4 ([xx]+1, [yy]+1, z+1), affect the texel T (x, y, z).

Thereafter, an average of color C of the four texels T1 through T4 is calculated as C=interpQuad(C1, C2, C3, C4, wx, wy), wherein Ci (i=1, 2, 3, or 4) is a color of a texel Ti, and wx (=xx−[xx]) and wy (=yy−[yy]) are weights. Thereafter, an average density D of the four texels T1 through T4 is calculated as D=interpQuad(D1, D2, D3, D4, wx, wy), wherein Di is an internal density of the texel Ti.

The average of color C is multiplied by a result of subtracting the average density D from 1 (C×(1−D)), thereby obtaining the color of the texel T for the cloud. Thereafter, the color of the texel T is output as a value of the texel T.

In short, the n-th texture generator 140_n may generate a texture by determining the color of each pixel of a final 2D image according to the internal density $d_i$ and the color of the texel T (x, y, z), and output the generated texture as the n-th texture.

Figure 21:
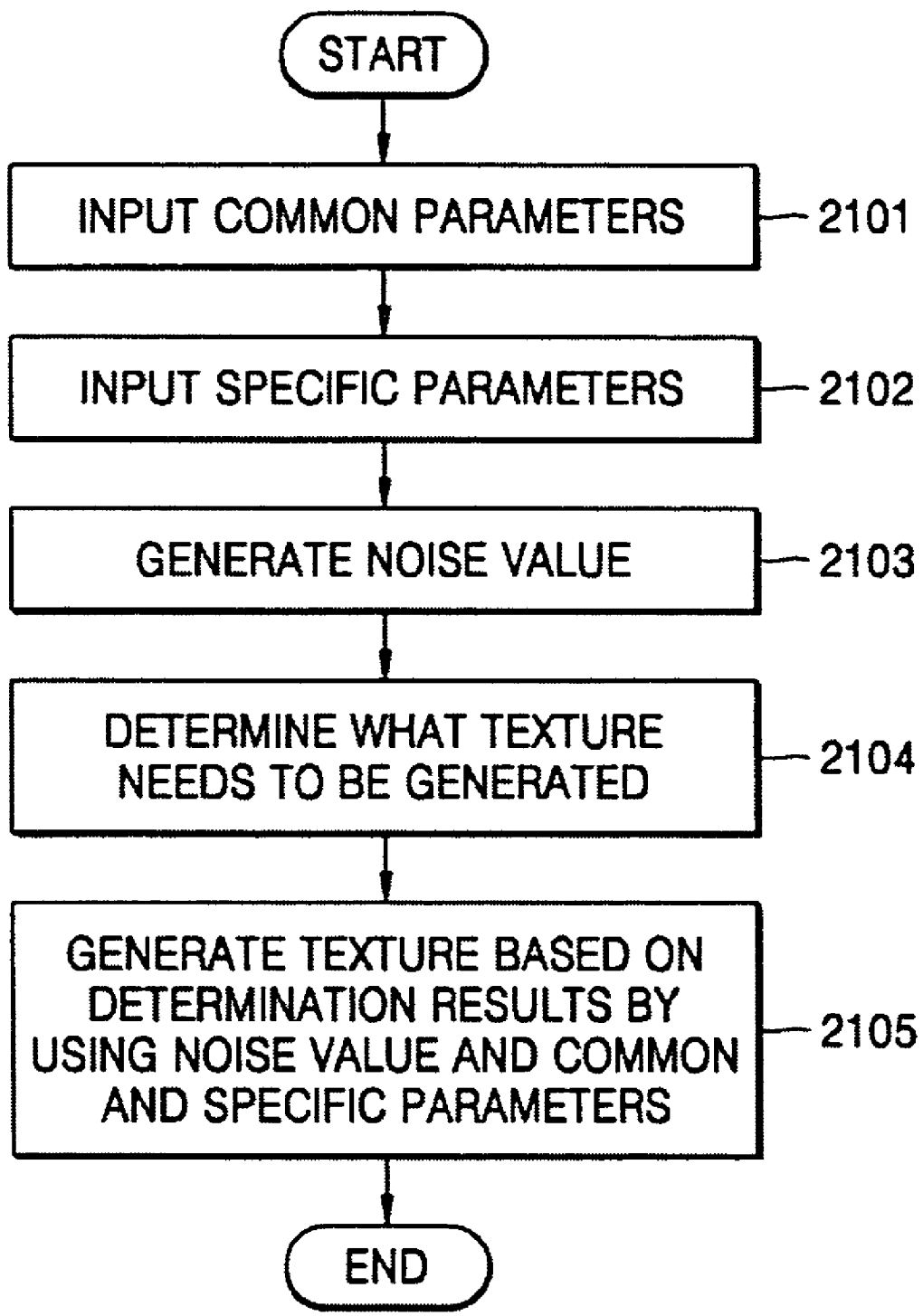
FIG. 21 is a flowchart illustrating a method of generating a procedural texture according to an embodiment of the present invention.

FIG. 21 is a flowchart illustrating a method of generating a procedural texture according to an embodiment of the present invention. Referring to FIG. 21, in operation 2101, a set of common parameters required to generate a procedural texture that represents any of a plurality of natural phenomena are input. The common parameters have been described above with reference to Table 1.

In operation 2102, a set of specific parameters required to represent a specific natural phenomenon are input. If the specific natural phenomenon is steam, the specific parameters shown in Table 2 may be input. If the specific natural phenomenon is smoke, the specific parameters shown in Table 3 may be input. If the specific natural phenomenon is fire, the specific parameters shown in Table 4 may be input. If the specific natural phenomenon is a cloud, the specific parameters shown in Tables 4 and 5 may be input. The specific parameters input in operation 2102 are parameters required to represent the physical properties of the specific natural phenomenon.

In operation 2103, noise values of a plurality of texels are generated by applying the common parameters input in operation 2101 and the specific parameters input in operation 2102 to a Perlin noise function.

In operation 2104, it is determined what procedural texture is to be generated by analyzing one of the common parameters input in operation 2101, e.g., the textureNode parameter.

In operation 2105, a procedural texture is generated, according to the determination results obtained in operation 2104, by using the common parameters input in operation 2101, the specific parameters input in operation 2102, and the noise values generated in operation 2103. In detail, as an example of one of the natural phenomena, if the determination results indicate that the specific natural phenomenon is steam, the first texture generator 140_1 generates a procedural texture in operation 2105 using the common parameters input in operation 2101, the specific parameters input in operation 2102, and the noise values generated in operation 2103. If the determination results indicate that the specific natural phenomenon is smoke, the second texture generator 140_2 generates a procedural texture in operation 2105 using the common parameters input in operation 2101, the specific parameters input in operation 2102, and the noise values generated in operation 2103. If the determination results indicate that the specific natural phenomenon is fire, the third texture generator 140_3 generates a procedural texture in operation 2105 using the common parameters input in operation 2101, the specific parameters input in operation 2102, and the noise values generated in operation 2103. If the determination results indicate that the specific natural phenomenon is a cloud, the n-th texture generator 140_n generates a procedural texture in operation 2105 by using the common parameters input in operation 2101, the specific parameters input in operation 2102, and the noise values generated in operation 2103.

The embodiments of the present invention have been described above as being applicable to the representation of such natural phenomena as steam, smoke, flames, and clouds. However, the present invention is also applicable to the representation of other natural phenomena, such as flowing water, whirlwinds, and erupting volcanoes.

In addition to the above-described embodiments, the method of the present invention can also be implemented by executing computer readable code/instructions in/on a medium, e.g., a computer readable medium. The medium can correspond to any medium/media permitting the storing and/or transmission of the computer readable code. The code/instructions may form a computer program.

The computer readable code/instructions can be recorded/transferred on a medium in a variety of ways, with examples of the medium including magnetic storage media (e.g., ROM, floppy disks, hard disks, etc.), optical recording media (e.g., CD-ROMs, or DVDs), and storage/transmission media such as carrier waves, as well as through the Internet, for example. The medium may also be a distributed network, so that the computer readable code/instructions is stored/transferred and executed in a distributed fashion. The computer readable code/instructions may be executed by one or more processors.

As described above, according to the present invention, a set of common parameters required to represent any of a plurality of natural phenomena, and a set of specific parameters required to represent each of the natural phenomena, are separately managed. Thus, the common parameters do not need to be modified even in a case in which a procedural texture representing a natural phenomenon other than the existing natural phenomena needs to be generated, or the specific parameters required for representing one of the existing natural phenomena need to be modified. Therefore, it is possible to facilitate the authoring or programming of a procedural texture.

In addition, the specific parameters represent the physical properties of a corresponding natural phenomenon. Thus, it is possible to generate a procedural texture capable of representing the physical properties of a natural phenomenon, such as a briskly burning fire, swirling smoke, and the height at which smoke disappears.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of generating procedural textures for a plurality of natural phenomena, the method comprising:

using a processor to perform the steps of:
inputting a set of common parameters required to represent the plurality of natural phenomena;
inputting a set of specific parameters required to represent physical properties of at least one of the natural phenomena;
generating a noise value using the common parameters and the specific parameters;
determining which procedural texture is to be generated according to the common parameters; and
generating the procedural texture according to the determination result using the noise value, the common parameters, and the specific parameters,
wherein the determining of which procedural texture is to be generated comprises analyzing a texture node included in the common parameters and determining the procedural texture to be generated according to the analysis result for the texture node, wherein the texture node is one of a plurality of virtual reality modelling language (VRML) nodes that respectively correspond to the natural phenomena.

2. The method of claim 1, wherein the noise value is generated using a Perlin noise function.

3. The method of claim 1, wherein the generating of the procedural texture is defined differently for each of the natural phenomena.

4. The method of claim 1, wherein, in response to determining a procedural texture representing steam that is to be generated, the generating of the procedural texture comprises:

calculating a rising distance in texels using a velocity parameter, which is one of the specific parameters;
calculating a three-dimensional (3D) noise vector using the rising distance in texels and the noise value;
calculating a turbulence value using the 3D noise vector;
calculating a distance from a center of the procedural texture to be generated using noise;
calculating a height at which the noise is applied;
calculating a density of the steam using the turbulence value, the distance from the center of the procedural texture to be generated using the noise, and the height at which the noise is to be applied; and
generating the procedural texture having the density of the steam as a texel value.

5. The method of claim 1, wherein, in response to determining a procedural texture representing smoke is to be generated, the generating of the procedural texture comprises calculating density at each texel of a normalized texture within a predetermined range, and calculating a height-dependent density.

6. The method of claim 1, wherein, in response to determining a procedural texture representing a flame is to be generated, the generating of the procedural texture comprises calculating density, which is used to interpolate in colorSpline, and opacity.

7. The method of claim 1, wherein, in response to determining a procedural texture representing a cloud is to be generated, the generating of the procedural texture comprises:
- calculating density at each texel of a 3D texture;
- calculating a color of each texel of the 3D texture using the calculated density at each texel of the 3D texture, and a direction and intensity of light incident on the 3D texture; and
- generating the procedural texture by reconstructing a color of each pixel of a 2D image according to the calculated density and color of each texel of the 3D texture.

8. An apparatus to generate procedural textures for a plurality of natural phenomena, comprising:
- a parameter input unit which separately inputs a set of common parameters required to represent the plurality of natural phenomena and a set of specific parameters required to represent physical properties of at least one of the plurality of natural phenomena;
- a texture generation unit which comprises a plurality of texture generators that generate a texture representing the natural phenomena;
- a noise generation unit which generates a noise value using the common parameters and the specific parameters, and transmits the noise value to the texture generation unit; and
- a texture determination unit which determines which procedural texture is to be generated according to the common parameters, and transmits the common parameters and the specific parameters to one of the texture generators according to the determination result,
- wherein the texture determination unit analyzes a texture node included in the common parameters and determines the procedural texture to be generated according to the analysis result for the texture node, wherein the texture node is one of a plurality of virtual reality modelling language (VRML) nodes that respectively correspond to the natural phenomena.

9. The apparatus of claim 8, wherein the noise generation unit generates noise using a Perlin noise function.

10. The apparatus of claim 8, wherein the parameter input unit comprises: a common parameter input unit which outputs the common parameters; and a specific parameter input unit which outputs the specific parameters.

11. The apparatus of claim 8, wherein if a texture generator of the plurality of texture generators generates a procedural texture representing steam, the texture generator calculates a rising distance in texels using a velocity parameter included in the specific parameters, calculates a three-dimensional (3D) noise vector using the rising distance in texels and the noise value, calculates a turbulence value using the 3D noise vector, calculates a distance from a center of the procedural texture to be generated using noise, calculates a height at which the noise is applied, calculates a density of the steam using the turbulence value, the distance from the center of the procedural texture to be generated using the noise, and the height at which the noise is to be applied, and generates the procedural texture having the density of the steam as a texel value.

12. The apparatus of claim 8, wherein, if a texture generator of the plurality of texture generators generates a procedural texture representing smoke, the texture generator generates a procedural texture by calculating density at each texel of a normalized texture within a predetermined range, and a height-dependent density.

13. The apparatus of claim 8, wherein if a texture generator of the plurality of texture generators generates a procedural texture representing a flame, the texture generator generates a procedural texture by calculating density, which is used to interpolate in colorSpline, and opacity.

14. The apparatus of claim 8, wherein if a texture generator of the plurality of texture generators generates a procedural texture representing a cloud, the texture generator calculates density at each texel of a 3D texture, calculates a color of each texel of the 3D texture using the calculated density at each texel of the 3D texture, and a direction and intensity of light incident on the 3D texture, and generates the procedural texture by reconstructing a color of each pixel of a 2D image according to the calculated density and color of each texel of the 3D texture.

15. At least one computer readable storage medium storing instructions that control at least one processor to perform a method of generating procedural textures for a plurality of natural phenomena, the method comprising:
- inputting a set of common parameters required to represent the plurality of natural phenomena;
- inputting a set of specific parameters required to represent physical properties of at least one of the natural phenomena;
- generating a noise value using the common parameters and the specific parameters;
- determining which procedural texture is to be generated according to the common parameters; and
- generating the procedural texture according to the determination results using the noise value, the common parameters, and the specific parameters,
- wherein the determining of which procedural texture is to be generated comprises analyzing a texture node included in the common parameters and determining the procedural texture to be generated according to the analysis result for the texture node, wherein the texture node is one of a plurality of virtual reality modelling language (VRML) nodes that respectively correspond to the natural phenomena.

16. A method of generating procedural textures for a plurality of natural phenomena, the method comprising:
- using a processor to perform the steps of:
  - receiving a set of common parameters required to represent the plurality of natural phenomena;
  - receiving a set of specific parameters required to represent physical properties of at least one of the natural phenomena;
  - generating a noise value according to the common and specific parameters;
  - determining at least one procedural texture to be generated according to the common parameters; and
  - generating the procedural texture using the noise value and the common and specific parameters,
- wherein the determining of which procedural texture to be generated comprises analyzing a texture node included in the common parameters and determining the procedural texture to be generated according the analysis result for the texture node, wherein the texture node is one of a plurality of virtual reality modelling language (VRML) nodes that respectively correspond to the natural phenomena.

17. The method of claim 16, further comprising storing the common and specific parameters separately so that the common and specific parameters are modified independently of one another.

18. A method of generating procedural textures for a plurality of natural phenomena, the method comprising:

using a processor to perform the steps of:
generating a noise value using common parameters required to represent the plurality of natural phenomena, and specific parameters required to represent physical properties of at least one of the natural phenomena;
determining a procedural texture to be generated according to the common parameters; and
generating the procedural texture using the noise value, the common parameters, and the specific parameters,
wherein the determining the procedural texture to be generated comprises analyzing a texture node included in the common parameters and determining the procedural texture to be generated according the analysis result for the texture node, wherein the texture node is one of a plurality of virtual reality modelling language (VRML) nodes that respectively correspond to the natural phenomena.

19. The method of claim 18, further comprising storing the common and specific parameters separately so that the common and specific parameters are modified independently of one another.

20. A method of generating procedural textures for a plurality of natural phenomena; the method comprising:

using a processor to perform the steps of:
receiving a set of common parameters to represent the plurality of natural phenomena;
receiving a set of specific parameters to represent physical properties of at least one of the natural phenomena;
determining which procedural texture to generate according to the common parameters; and
generating the procedural texture according to the common and specific parameters,
wherein the determining which procedural texture to be generated comprises analyzing a texture node included in the common parameters and determining the procedural texture to be generated according the analysis result for the texture node, wherein the texture node is one of a plurality of virtual reality modelling language (VRML) nodes that respectively correspond to the natural phenomena.

21. The method of claim 20, further comprising generating a noise value using the common and specific parameters, wherein the noise value is also used in the generating of the procedural texture.

22. The method of claim 20, wherein the common and specific parameters are separately managed so that either set may be modified independently of the other.

* * * * *